United States Patent [19]
Tong et al.

[11] Patent Number: 5,272,704
[45] Date of Patent: Dec. 21, 1993

[54] METHOD AND APPARATUS FOR GENERATION OF MULTI-BRANCHED DIAGNOSTIC TREES

[75] Inventors: David W. Tong, Scotia; Christopher H. Jolly; Kevin C. Zalondek, both of Schnectady, all of N.Y.

[73] Assignee: General Electric Company, Schenectady, N.Y.

[21] Appl. No.: 395,826

[22] Filed: Aug. 18, 1989

[51] Int. Cl.$^5$ ............................................. G06F 15/00
[52] U.S. Cl. ..................................... 371/23; 371/15.1; 395/55
[58] Field of Search ......................... 364/513; 395/55; 371/15.1, 23

[56] References Cited

U.S. PATENT DOCUMENTS 4,918,621  4/1990  Nado et al. ......................... 364/513

OTHER PUBLICATIONS

Cantone et al., "In-Ate TM: Fault Diagnosis as Expert System Guided Search", paper to appear in Computer Expert Systems. L. Bole and M. J. Coombs (eds.), Springer-Verlag, Heidelberg, 1987.

Pipitone, "The FIS Electronics Troubleshooting System", Computer 19 (1986) pp. 68-76.

Ben-Bassat et al., "AI-Test A Real Life Expert System for Electronic Trouble-Shooting (A Description and a Case Study). Proceedings of the Fourth Conference on Artificial Intelligence Applications", San Diego, 1987, pp. 2-10.

de Kleer et al., "Diagnosing Multiple Faults", Artificial Intelligence, 32 (1987) 97-130.

Tong et al., "Diagnosing An Analog Feedback System Using Model-Based Reasoning", to appear in Proceeding of the 1989 AI Systems in Government Conference, Washington, D.C.

Sussman et al., "Constraints—A Language for Expressing Almost-Hierarchical Descriptions", Artificial Intelligence, vol. 14, (1980) pp. 1-39.

*Primary Examiner*—Allen R. MacDonald
*Attorney, Agent, or Firm*—Paul R. Webb, II

[57] ABSTRACT

A method and apparatus for automated generation of multi-branched diagnostic trees is described. The present invention generally is practiced on model-based diagnostic systems and utilizes a candidate generator, constraint propagator and best measurement generator, along with a model of a system to be diagnosed, to generate nodes and branches of a diagnostic tree.

36 Claims, 9 Drawing Sheets

METHOD AND APPARATUS FOR GENERATION OF MULTI-BRANCHED DIAGNOSTIC TREES

The present invention relates to isolating defective and/or improperly operating components in a system, and more specifically, relates to automated generation of multi-branched diagnostic trees utilized to isolate faulty components.

RELATED APPLICATIONS

The present application is related to copending commonly assigned U.S. patent application Ser. Nos. 07/489,120 filed Mar. 5, 1990 now abandoned, 07/487,515 filed Mar. 2, 1990 now U.S. Pat. No. 5,150,367 and 07/487,083 filed Mar. 2, 1990 now abandoned entitled, respectively, "Constraint Propagation Control", "Fuzzy Range Constraint Propagation Control", and "Minimal Intersection Identification/Wide Range Suppression Constraint Propagation Control."

BACKGROUND OF THE INVENTION

Fault isolation, as used herein, refers to a process for identifying a faulty component or components of a system which is not operating in accordance with predetermined operating parameters. The fault isolation process generally begins at detection of abnormal system behavior and proceeds to identification of a "faulty", i.e. defective and/or improperly operating, component and/or components. With complex equipment, such as electronic control circuits, the fault isolation process requires expert knowledge of the equipment and is a time-consuming and difficult task.

To facilitate fault isolation, paper-based maintenance and troubleshooting instructions, such as service manuals, generally are utilized. For complicated systems, however, the service manuals are voluminous, require a great amount of time to generate, and are highly susceptible to incompleteness and errors. Further, in order to isolate a fault in a reasonable amount of time, the system user generally must have some expertise and knowledge of the system.

To improve upon fault isolation through paper-based instruction manuals, rule-based expert systems for practice on computers have been implemented. The rules, generally referred to as a knowledge base, of these expert systems embody the experience and heuristic knowledge of a human expert.

Because extracting heuristic and experiential knowledge from a human is difficult and time-consuming, systems for performing diagnosis based on more fundamental knowledge, i.e., knowledge that could be available from the system designer or from design documentation, have been implemented. Such fundamental knowledge is often embodied in a software model, sometimes referred to herein as a model, representation of the system. For example, an electric circuit is often represented by a circuit schematic or higher level block diagrams. The model contains functions of system components, functionality of the components, and connections between the components. Systems for developing conclusions, i.e. deductions, based upon a descriptive model for purposes such as diagnosis are often referred to as model-based reasoning systems. Model-based reasoning systems are more "automated" than rule-based expert systems because model-based systems eliminate utilization of experiential knowledge. Rather, model-based systems use generic, reusable, diagnostic information and procedures.

Known models used in model-based diagnosis systems can be categorized into two categories, namely "connectivity" models and "connectivity and functional" models. A connectivity model, sometimes referred to herein as a connectivity-only model, comprises nodes and directed connections. Each node represents a component of the system being diagnosed and directed connections indicate the structural formation, i.e. the connectivity, of the system components. In the connectivity model, only the structure of the system is modelled. The actual operation, i.e. the function, performed by each system component is not modelled or utilized. Therefore, the nominal values of system variables for a specific test condition are predetermined by some other simulation method.

With the connectivity model, the system variables can only be represented qualitatively as being "GOOD" or "BAD". That is, the actual operating value of a system variable is either equal to (GOOD) or not equal to (BAD) the predetermined nominal value of the variable. A model-based diagnostic system based upon a connectivity model thus makes deductions only with qualitative information. Although the connectivity model used in some model-based diagnosis procedures may be satisfactory to identify faulty components in simple systems, the connectivity model generally inhibits accurate fault isolation in more complex systems, especially those having feedback loops. For example, if one component in a feedback loop is indicated as being "BAD", diagnosis with the connectivity model can only indicate that the entire feedback loop is "BAD" and further isolation of a faulty component with the connectivity model is impossible.

"Connectivity and functional" models, on the other hand, allow functional behavior of system components to be expressed in specific numerical, i.e. quantitative, terms or in qualitative terms. Model-based reasoning systems, when using quantitative models, can make use of quantitative measurement information and thus generally provide more accurate diagnosis than qualitative methods. The quantitative results are specific numerical values for each terminal, such as 5.01 V, as opposed to qualitative values, such as BAD. Model-based reasoning systems which provide quantitative results, however, require, in many applications, computing resources and time that are beyond those available.

With connectivity and functional software models, the system to be diagnosed is modelled by using both the quantitative transfer function of each component and the connectivity of the systems components. Therefore, with the connectivity and functional model, however, extensive calculations must be performed, especially when complex system components having complicated transfer functions are represented in the model. Although fault isolation with connectivity and functional models is very accurate, the time period required to complete the fault isolation process utilizing this model can preclude real-time diagnostic operations.

Model-based diagnostic systems also generally include a deductive mechanism, such as a constraint propagation mechanism, which forms predictions or estimations as to values of system variables at terminals of each system component represented in the model. For example, in one embodiment of a constraint propagation, occurs when all but one terminal of a component has a measured or deduced value. A value is determined for the one terminal by propagation, i.e. execution of the transfer function of the system component from the other terminal values. Reference to inputs and outputs of a component is not important, or even utilized, by the propagation mechanism. Specifically, terminal values for system component outputs can be determined from component inputs and component inputs can be determined from component outputs by manipulating the transfer function of the component. Other embodiments of constraint propagation mechanisms are also known, such as propagation mechanisms which allow propagation when two terminals of a component do not have values. With this mechanism, a symbol is assigned to one of the terminals without value and a symbolic expression is determined for the other terminal without value. Such propagation is sometimes referred to as symbolic constraint propagation.

Each value propagated by the propagation mechanism through each system component depends on the proper operation of a set of components, and each set of dependencies is recorded using a mechanism sometimes referred to herein as a dependency tracking mechanism. When an inconsistency occurs between a propagated value, i.e. a value predicted by the propagation mechanism, and an actual measured value at a terminal, or between two propagated values at a terminal, a conflict is recorded. The set of components involved in the conflict, i.e. the conflict set, is identified from the sets of components from which each propagated value depends. If the propagated and/or measured values at a terminal concur, no conclusions are drawn. Specifically, the dependent components from which concurring values depend cannot be assumed to be fault-free since a true fault may not be evidenced by one particular measurement.

Fault isolation also often requires a best measurement selection mechanism. This selection mechanism identifies the next best measurement to perform for efficient fault isolation. Specifically, the measurement selection mechanism instructs, through an interface, a system user to make a measurement at a selected terminal in order to further isolate the faulty component. The system user enters a measured value of the selected terminal, and then this measured value is utilized for another sequence of propagation through the model by the propagation mechanism.

As propagation and measurement continues, a number of conflict sets will be outstanding from which fault candidates can be derived. A fault candidate comprises a set of components which includes at least one component from each conflict set. The failure of all components of a fault candidate is a valid explanation for all the measurement results. A "single fault" candidate is a component common to all conflict sets. A "multiple fault" candidate contains components not included in all conflict sets. As propagation is repeated, the actual fault is more isolated and eventually identified so that the appropriate system component can be replaced or repaired.

Because fault isolation using model-based diagnostic systems is time consuming, test procedures to be followed for fault isolation often are represented in the form of a decision tree, generally referred to as a fault tree or a diagnostic tree. Such a tree includes nodes which identify tests to be performed and branches which represent possible outcomes of each test. As used herein, a test is defined as a measurement at a specific terminal within a system being diagnosed. The tree also contains "leaf" nodes which terminate various paths within the tree and represent conclusions, e.g., a specified component is faulty, based on test results obtained for each specific path.

Some diagnostic trees are termed "binary" trees because these trees only accept binary test results, i.e. GOOD or BAD. Therefore, after performing a test indicated by each node, only two branches or paths can be followed. A binary diagnostic tree can be generated using a diagnostic system based upon a connectivity-only model. Binary results provide incomplete information, for example, because these results do not indicate how badly a system component is operating. Further, a multiple fault candidate generally cannot be found by a binary diagnostic tree. Therefore, once one faulty component is repaired, the entire fault isolation process must be repeated to identify other faulty components. This process is time-consuming. Also, as with the conductivity-only model, the binary tree cannot be used to precisely isolate faulty components in feedback loops.

Ternary diagnostic trees, i.e. each measurement node containing three branches usually denoted HIGH, OK, or LOW, also have been implemented. A known fault-isolation system is a model-based diagnostic system that uses a connectivity and quantitative functional model of a system to be diagnosed and automatically generates a ternary tree therefrom. With the above-identified fault-isolation system, however, higher branching-factor trees cannot be generated. None of the known art utilizes a model-based diagnostic system using a connectivity and functional model, which expresses functional behavior of system components in quantitative terms, to automatically generate, off-line, a multi-branched diagnostic tree, the branching-factor of each node being selected by a system user or by the system itself and being variable.

OBJECTS OF THE INVENTION

It is therefore an object of the present invention to provide a method and apparatus for generation of multi-branched diagnostic trees which overcome the foregoing disadvantages and shortcomings.

Another object of the present invention is to provide a method and apparatus for automated generation of multi-branched diagnostic trees based on a connectivity and functional model which expresses functional behavior of system components in quantitative terms.

Still another object of the present invention is to provide a method and apparatus for generation of multi-branched diagnostic trees which allow flexibility in selection of a branching factor in fault isolation.

Yet another object of the present invention is to provide a method and apparatus for generation of multi-branched diagnostic trees which may automatically select an optimum branching factor for the tree.

Still yet another object of the present invention is to provide a method and apparatus for generation of multi-branched diagnostic trees which isolate multiple as well as single faults.

SUMMARY OF THE INVENTION

The present invention for automated generation of a multi-branched diagnostic trees utilizes known mechanisms, such as a constraint propagation mechanism and a best measurement mechanism, as well as a model of a system to be diagnosed, to automatically generate a diagnostic tree. Briefly, the model of the system to be diagnosed preferably is in the form of a connectivity and functional model. The functional model expresses functional behavior of system components in quantitative terms. The diagnostic reasoning system accepts actual test measurements of variables at terminals of the system to be diagnosed as inputs, and based on propagation by the propagation mechanism through the software model, fault candidates are generated. The best measurement mechanism, sometimes referred to herein as the next best measurement mechanism, then identifies the next terminal to be measured for efficient fault isolation, such as by minimizing cost and/or time. A system user then performs the identified measurement and another sequence of propagation is begun.

To perform a tree generation task, the reasoning system performs constraint propagation to deduce terminal values. Typically, the propagation mechanism deduces numeric intervals, also referred to herein as ranges, i.e., accepting numeric intervals at terminals of components and estimating intervals on another terminal. For certain operations, however, single numbers rather than intervals are utilized. The system user then selects a desired branching factor for the diagnostic tree and assigns a value, e.g. HIGH, LOW, etc., to each of these ranges. Importantly, the system user may select any granularity, for example, VERY HIGH, HIGH, OK, LOW and VERY LOW. Increased granularity results in a diagnostic tree having an increased number of branches.

Once the desired granularity is selected, tree generation continues by representing a test measurement at a terminal in the system model as a root node having branches extending therefrom. Importantly, the root node may represent measurement of a set of terminals. The terminal associated with the root node generally will be an output terminal of the system to be diagnosed. The number of branches extending from the root node corresponds to the selected granularity. For example, for a granularity of three, three branches will extend from the root node to form a ternary tree. Each branch corresponds to a specific numerical or numeric interval and may be labelled with a qualitative value. Assuming that a measurement returns a numeric value, then the interval containing that value is propagated through the system model by the propagation mechanism. Conflicts are then determined and candidate sets are generated. The best measurement mechanism then identifies the next best terminal to be measured. Measurement of this next best terminal will be represented by an internal tree node attached to a corresponding branch.

For the ternary tree, three branches extend from the root node and each internal node, and each of these branches will terminate in either another internal node or a leaf node. Again, each branch extending from each branch node corresponds to one of three interval values. The process is repeated until a particular component or components are identified by the system as faulty thereby completing an entire path of the diagnostic tree. The leaf nodes identify a faulty component or components. Iteration through all possible branches generates the complete tree.

Unlike a binary tree which always terminates at leaf nodes representing single faults, the present apparatus and method provide generation of a multi-branched tree which may contain nodes representing both single and multiple faults. These multiple fault nodes are generated when the system detects nonoverlapping conflict sets resulting from propagation. The tree generation process can be continued at these multiple fault nodes until all possible faults are identified or all available terminals, i.e. measurements, are exhausted. Alternatively, the generation process can be terminated when a multiple fault is detected and the diagnostic system can then calculate the most probable fault candidate.

From the foregoing, it should be understood that the present apparatus and method for generation of multi-branched diagnostic trees is automated thereby eliminating a time consuming manual tree generation process. The present apparatus and method also allows a system user flexibility in the selection of measurement result granularity in fault isolation, thus allowing the system user to balance between the required diagnostic power of the tree and the tree size or tree generation time. Further, by utilizing the connectivity and functional model which expresses functional behavior of system components in quantitative terms, the present invention provides accurate fault isolation.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

Figure 1:
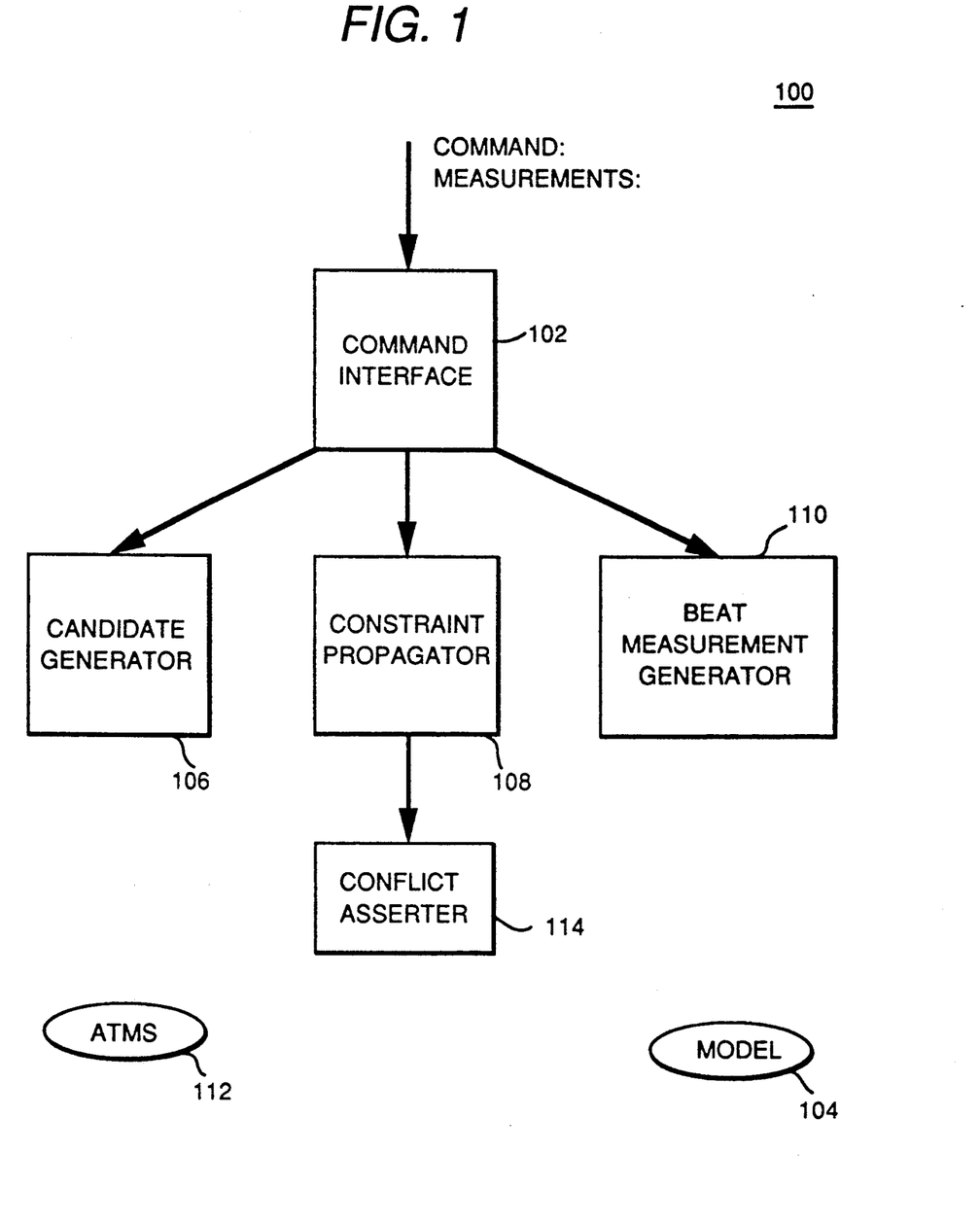
FIG. 1 is a system diagram of a model-based system for fault isolation.

A model-based diagnostic system 100 as shown in FIG. 1 typically includes a command interface 102 through which a system user enters commands. The user may also enter and edit information, through the interface, for generation of a model 104 for a system to be diagnosed. The system user generally enters commands to perform propagation, candidate generation, and best measurement selection as hereinafter described. The diagnostic system also includes a conflict generator 106 which generates conflict sets, and a constraint propagator 108 to deduce terminal values. The diagnostic system further includes a best measurement generator 110 to determine a measurement within the system being diagnosed which, if performed, would provide the most information towards isolating a fault or, equivalently, results in the fewest measurements required to isolate the fault. A dependency tracking system 112 is used to record, i.e. track, dependencies of system components. The dependency tracker is illustrated in FIG. 1 as an assumption-based truth maintenance system ATMS but may be implemented in other ways. A conflict asserter 114 determines inconsistencies between predicted values generated by the constraint propagator and actual measured values, and communicates identified inconsistencies to the ATMS which identifies the conflict sets associated with these inconsistencies.

Figure 2:
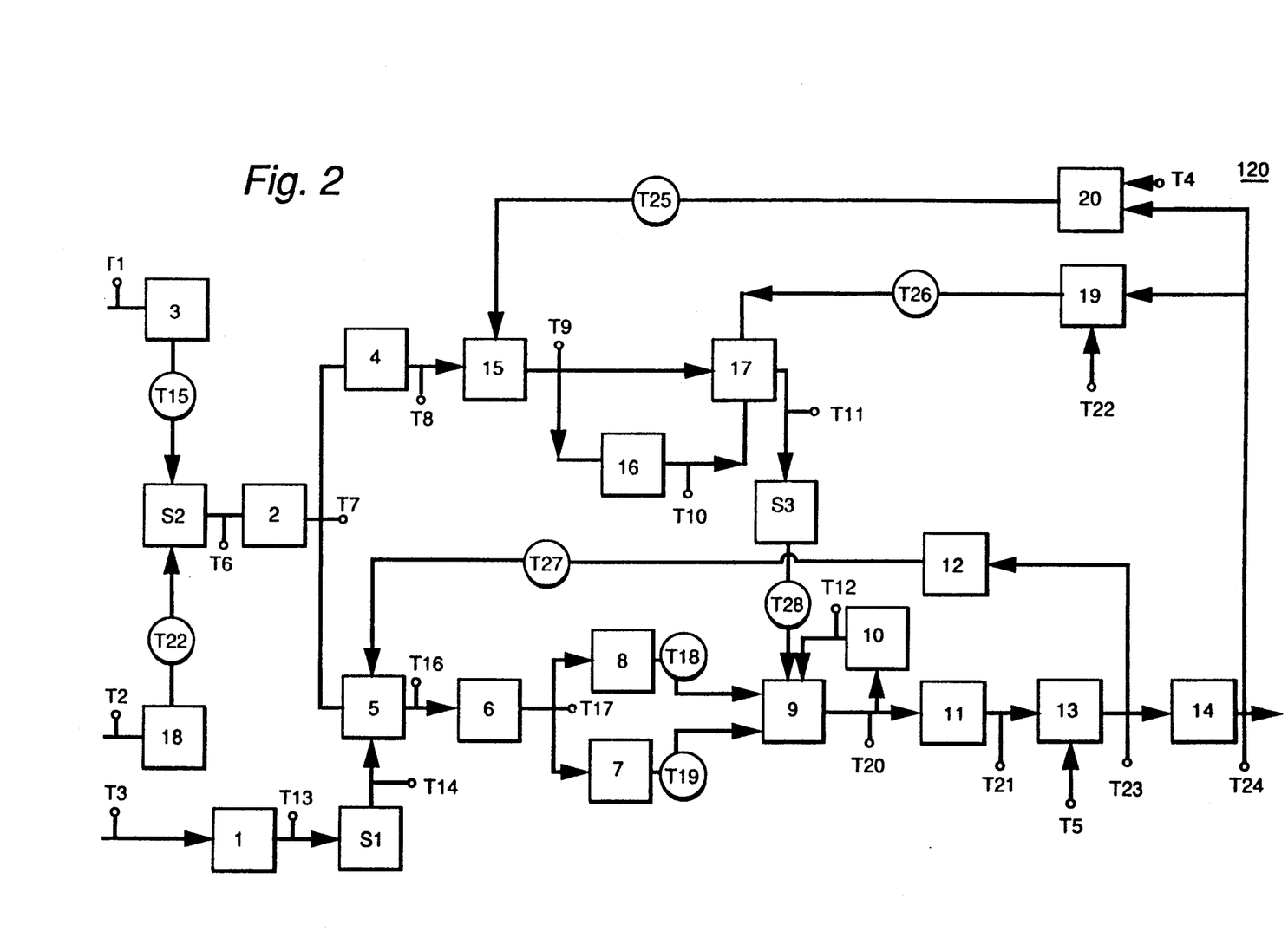
FIG. 2 is block diagram of a feedback control system.

Model 104 of the system to be diagnosed is stored in a block of memory locations in the computer. The model generally is manually generated by a system engineer who enters the connectivity and the transfer functions of each system component through interface 102 of system 100. Inputs and outputs of each component of a system to be diagnosed are represented as terminals T1-T29 in the model and each component 1-20 is represented as a block. FIG. 2 illustrates an example of a model of a system to be diagnosed. Importantly, although directionality is indicated in FIG. 2 by arrows, i.e. inputs and outputs, directionality in the model is not necessary for operation of the propagation mechanism. For example, terminal value information can be propagated from input-to-output or output-to-input of each component.

The system shown in FIG. 2 is an analog circuit having multiple coupled feedback loops, having on the order of one-hundred base-level components. Most of the components are electronic but some are electromechanical in nature. For example, an output variable at terminal T24 is velocity and primary inputs at terminals T1 and T2 are electrical signals. Auxiliary inputs to the system at terminals T3, T4 and T5 include a velocity sensor, a fluid pressure sensor for a hydraulic drive, and a drag sensor, respectively. In the model illustrated in FIG. 2, the level of fault isolation need only be to the level represented by each block.

Each block in FIG. 2 represents a specific function such as a demodulator, and each block has a number therein, i.e. 1-20. The system also includes a plurality of switches S1-S3. Transfer functions for most of the blocks are derived from an idealized detailed schematic. For example, the transfer function for a simple amplifier is a linear gain with upper and lower bounds at the operational amplifier saturation levels.

Briefly, once the model has been completed for a particular device, diagnosis of faults proceeds by using the constraint propagation mechanism to form predictions as to specific values of each terminal of the system. Inconsistencies are detected and conflict sets are identified. These steps could be very computationally intensive depending upon the complexity of the system to be diagnosed.

Each value of each terminal as predicted by the propagation mechanism generally depends on the correct operation of a set of components, and during propagation, each set of dependencies, i.e. all components whose correct operation is assumed for the deduction of a terminal value is recorded. The sets of dependencies are maintained in the dependency tracking mechanism for each deduced terminal value. When there is a conflict at a terminal between a predicted value and a measured value, or between two propagated values, then a conflict is established. The set of components involved in the conflict, i.e. the conflict set, can be identified from the sets of dependencies of each propagated value. If the values at a terminal concur, no conclusions are drawn.

One of the most important steps in fault isolation is the identification of the next best measurement to perform after propagation of an earlier measured value for a terminal. An example of a method for determining the next best measurement is described in de Kleer et al., "Diagnosing Multiple Faults", Artificial Intelligence, 32 (1987), 97-130. Once the next best measurement has been determined, the expert system identifies the terminal to be measured and the system user makes the indicated measurement on the actual system. The measured value is then input to command interface 102. The propagation mechanism receives this value and then proceeds with constraint propagation through model 104 as far as possible. Conflicts are again recorded, the next best measurement is identified, and the system user is instructed to another selected measurement. The process is repeated until the conflict sets are reduced to specific faults, both single and multiple, thereby isolating the fault.

Figure 3:
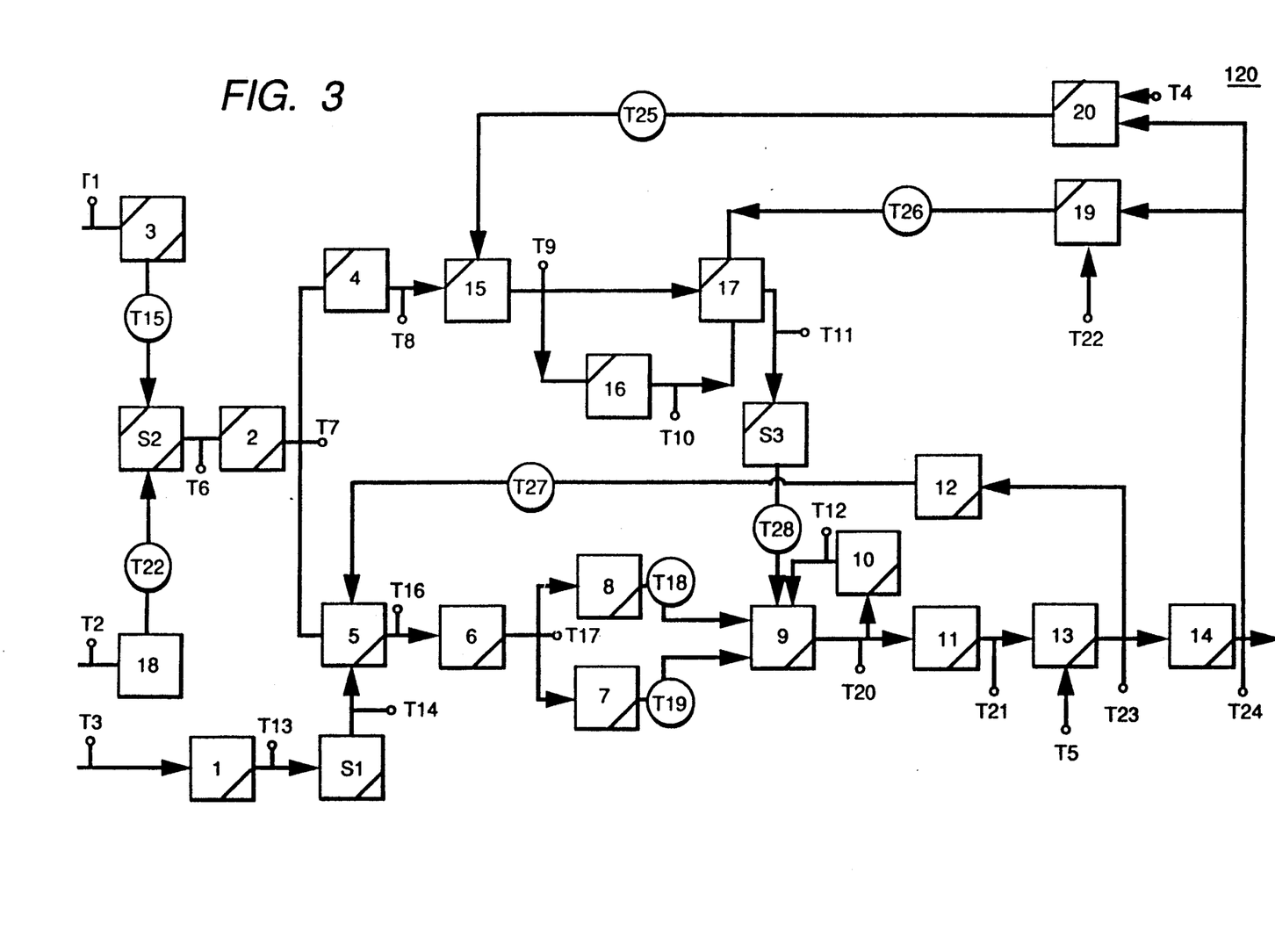
FIG. 3 is the block diagram shown in FIG. 2 and further including identified conflict sets.

As an example of fault isolation, and with reference to FIG. 2, when a non-zero value is assigned to input terminal T1 and zero is assigned to the output present at terminal T24, the expert system indicates a first conflict involving all system components, except for component 18 at terminal T2 which is an alternate input to the circuit model. The best measurement generator then indicates that terminal T11 is the next best measurement. This choice can be readily justified since the model includes two main feedback loops coupled through switch S3. A measurement at terminal T11 therefore effectively separates the two main feedback loops. FIG. 3 illustrates the system shown in FIG. 2, and FIG. 3 further indicates conflicts sets found after a measurement at terminal T11.

Inputting a measured value of zero at terminal T11 initiates another sequence of propagation in conflict finding. After this propagation, two conflict sets are formed as indicated by the shading of each block in FIG. 3. A first conflict set is indicated by shading on the lower right corner of blocks in the first set and a second set is indicated by shading the upper left corner of blocks in the second set. As shown, three components, blocks 2 and 3, and switch S2 are common to both conflicts and these components are identified as single fault candidates. The next best measurement determined by the best measurement generator is terminal T6 which substantially is the midpoint of the single fault candidates. Thus, the best measurement generator isolates the highest probability candidates. That is, it is more probable that a single component is faulty rather than multiple components.

If the measured and predicted values are the same for terminals T6 and T7, then two nonoverlapping conflicts sets remain. That is, the first and second conflict sets must each contain a faulty component and the presence of multiple faults is confirmed. The propagation and measurement selection process then continues to reduce each conflict set to a single faulty component. Further detail as to the operation of expert systems is presented in Tong et al., "Diagnosing An Analog Feedback System Using Model-Based Reasoning", Computer Society Press Reprint (IEEE), reprinted from Proceedings of the Annual AI Systems In Government Conference, Wash. D.C., Mar. 27-31, 1989.

Figure 4A:
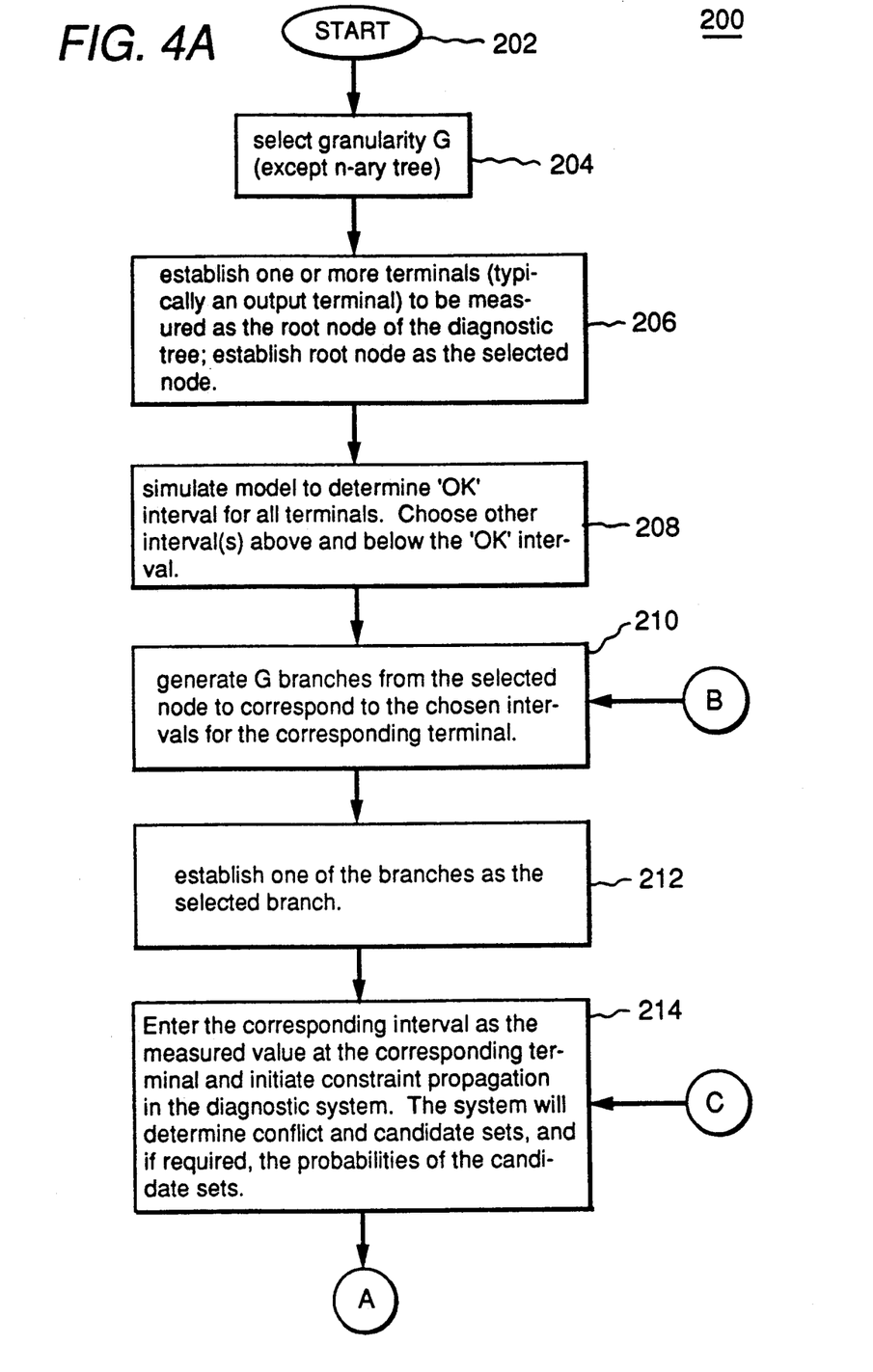
FIGS. 4A-B show a flow chart illustrating the sequence of steps to generate a multi-branched diagnostic tree in accordance with the present invention.
Figure 4B:
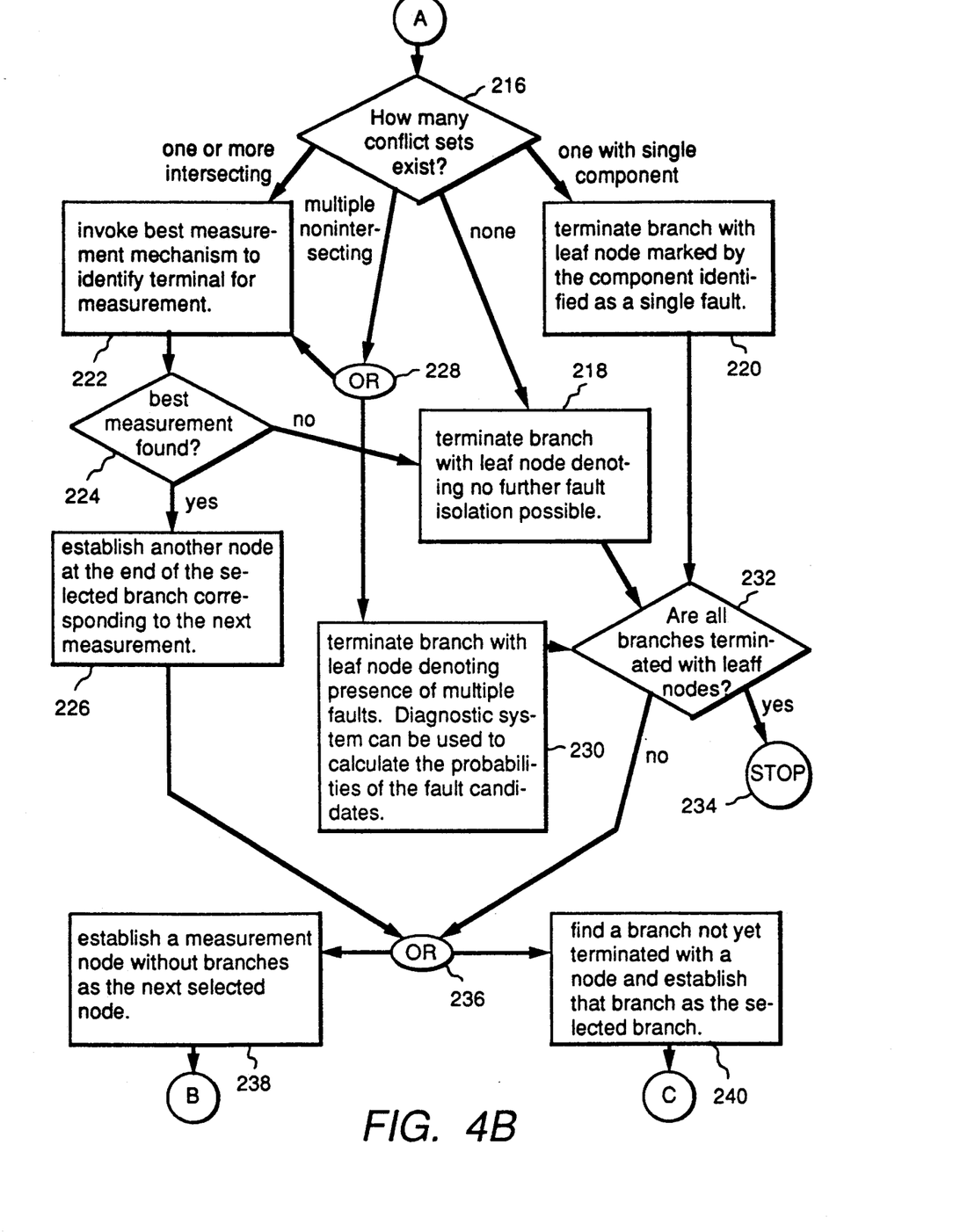

FIGS. 4A-B illustrate a flow chart 200 of one embodiment of the present method for practice on automated generation of multi-branched diagnostic trees. Although the present method is practiced on model-based diagnostic system, the present method is not limited to practice on a specific model-based diagnostic system. For illustrative and explanatory purposes, however, the present method is described sometimes with reference to mechanisms of the hereinbefore described diagnostic system. Further, the exact order of execution of each identified instruction is not limited to the order shown in the flowchart. As shown in FIG. 4A, once the process has started as indicated at block 202, the first step of the present method is for the system user to select a granularity describing measurement results as represented by the branching factor of the diagnostic tree as identified at block 204. For example, if the system user selects a granularity of three, then the diagnostic tree will be a ternary tree and the user will define three specific values or ranges of values to correspond to HIGH, OK and LOW. By allowing the system user to select the granularity, the diagnostic tree will provide the appropriate level of information used for each specific application. For example, with combinational logic digital circuitry, a binary tree may be satisfactory whereas in analog circuitry more granularity generally will be desired. Also, as identified in block 204, granularity is not selected at this point for the n-ary tree.

The next step, as indicated at block 206, is to establish a terminal for measurement, typically an output terminal of system model, as a root node and as a first measuring point of a diagnostic tree. The root node, however, could be selected to be another terminal represented in the system model. Based upon previous analysis, an expected value or range of values of the signal which should be present at each system terminal is predicted as shown in block 208. The actual value can then be measured by a system user. For purposes of explanation here, the system user has selected a granularity of three corresponding to HIGH, OK and LOW, respectively. It is to be understood, however, that these qualitative values are for illustrative purposes only. The system user then selects which value or range of values will correspond to HIGH or LOW, the predicted value or range of values being designated as OK.

Figure 5:
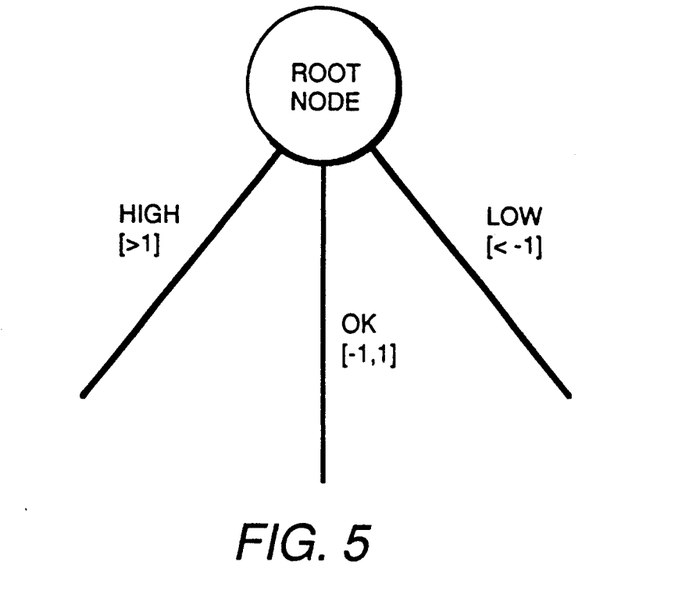
FIG. 5 illustrates generation of a portion of a ternary tree.

As indicated at block 210, branches are then generated, and these branches extend from the root node as illustrated in FIG. 5. As indicated in block 210 and shown as one example in FIG. 5, each branch corresponds to one assigned value or interval values. For illustrative purposes, interval values are shown corresponding to each branch, and the example shown in FIG. 5 indicates that HIGH, LOW and OK, respectively have assigned interval values of greater than one, less than negative one, and from negative one to one, respectively.

As indicated in block 212, the next step is to select one of the branches of the selected node for analysis. The constraint propagator is initiated as shown in block 214 to perform deductions starting with the interval value associated with the selected branch. The system will then determine conflict and conflict sets, and if required, the probability of fault of each candidate set. For illustrative purposes, if a value greater than one was entered for the tree shown in FIG. 5, then the interval value of the "HIGH" branch is entered as the assumed measured value for the terminal associated with the root node. Constraint propagation then takes place and conflict sets are determined.

As shown in FIG. 4B after connector A, after determining conflict sets, various alternatives are possible. Specifically, the system determines, as indicated at block 216, how many conflict sets exist. If no conflict sets are found, as indicated at block 218, this result could mean that either no inconsistencies exist above the detection threshold, or that the granularity chosen does not permit further isolation. In these cases, the branch typically is terminated with a leaf node denoting no further fault isolation is possible. It is contemplated, however, that in certain special circumstances, such as when generating a tree for a system having multiple output terminals, all of which have not yet been measured, that diagnosis may be continued by invoking the best measurement mechanism to identify a next terminal for measurement, i.e., proceeding to the step recited in block 222. If one conflict set remains containing a single component, as indicated at block 220, the selected branch is terminated with a leaf node marked by the component identified as a single fault.

If one or more intersecting conflict sets remain, as indicated at block 222, then further search is possible to identify a single fault. The best measurement mechanism is invoked to identify the most informative terminal to measure. If no best measurement is found, as illustrated at decision block 224, it is possible that no relevant measurements remain or are possible, in which case the branch is terminated with a leaf node as shown in block 218.

Figure 6:
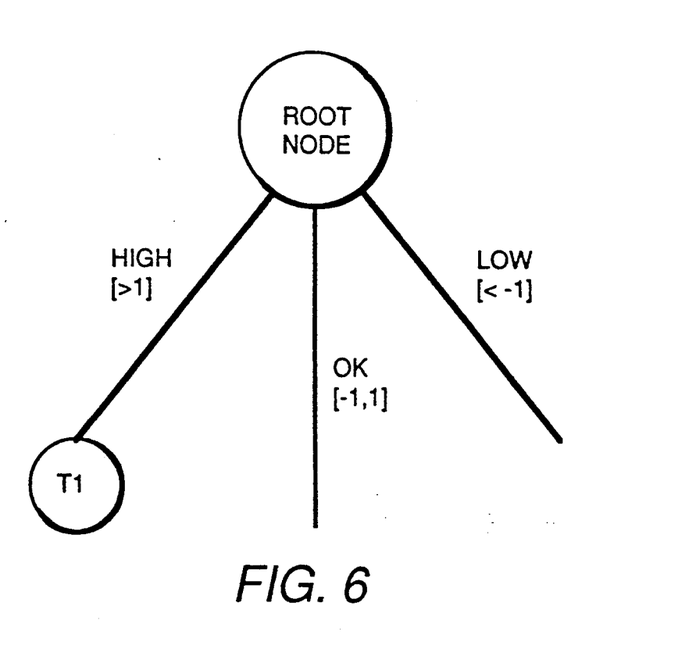
FIG. 6 illustrates further generation of the ternary tree illustrated in FIG. 5.

If a best measurement is found, then another node is established at the end of the selected branch corresponding to the found next measurement, as illustrated in block 226. For example, in FIG. 5, if the "HIGH" measurement resulted in one or more intersecting conflict sets, and if the best measurement mechanism returned a specific terminal, T1, then the measurement of T1 is then established as another internal node attached to the "HIGH" branch, as shown in FIG. 6.

If multiple nonintersecting conflict sets remain, as indicated by block 224, the existence of multiple simultaneous faults is definite although the faults are not yet isolated. For some applications it may be sufficient to calculate the most likely fault candidate and its probability as indicated in block 230. The path can then be terminated with a leaf node containing this information. Alternatively, fault isolation can be continued by proceeding to block 222 and invoking the best measurement generator. In practice, the number of possible multiple faults may be enormous and the latter alternative, i.e. proceeding to block 222, will be computationally expensive and the resultant tree could be quite large.

After a leaf node is attached to a given branch by operations indicated by blocks 218, 220 or 230, the tree-generation mechanism searches for paths not yet terminated with a leaf node as indicated at decision block 232. If all the branches are terminated with leaf nodes, then the tree generation process stops as indicated at stop block 234. If all the branches are not terminated with leaf nodes, or if another node is established at the end of a branch as indicated in block 226, then the proceeds to OR block 236.

The tree generation mechanism can proceed from OR block 236 either in a "depth-first" manner by setting the newly established node from block 226 as the selected node as indicated in block 238 and return to block 210 as shown by connector B, or in a "breadth-first" manner by choosing another unterminated branch as the selected branch as indicated in block 240 and return to block 214 as shown by connector C. Since the tree must ultimately contain only completed paths, i.e., all paths terminating in leaf nodes, both manners are equivalent.

It should be understood therefore, that the present method for generation of multi-branched diagnostic trees is automated and utilizes methods for deducing values of terminals, identifying conflicts and candidate sets, determining the next best measurement, and the isolation of faults. The tree generation process generally is performed off-line, i.e. not in real-time, because the process may be computationally expensive in terms of calculation time.

Once the tree is generated, however, the system user utilizes the tree, in real-time, to isolate faults. Specifically, the user simply makes a first measurement, i.e. the measurement indicated at the root node, and depending on the value of the measurement (e.g., HIGH, OK or LOW) the diagnostic tree will quickly indicate the best next measurement to be made for fault isolation. The system user simply and quickly follows a path of the tree to isolate a fault as indicated by a leaf node.

Figure 7:
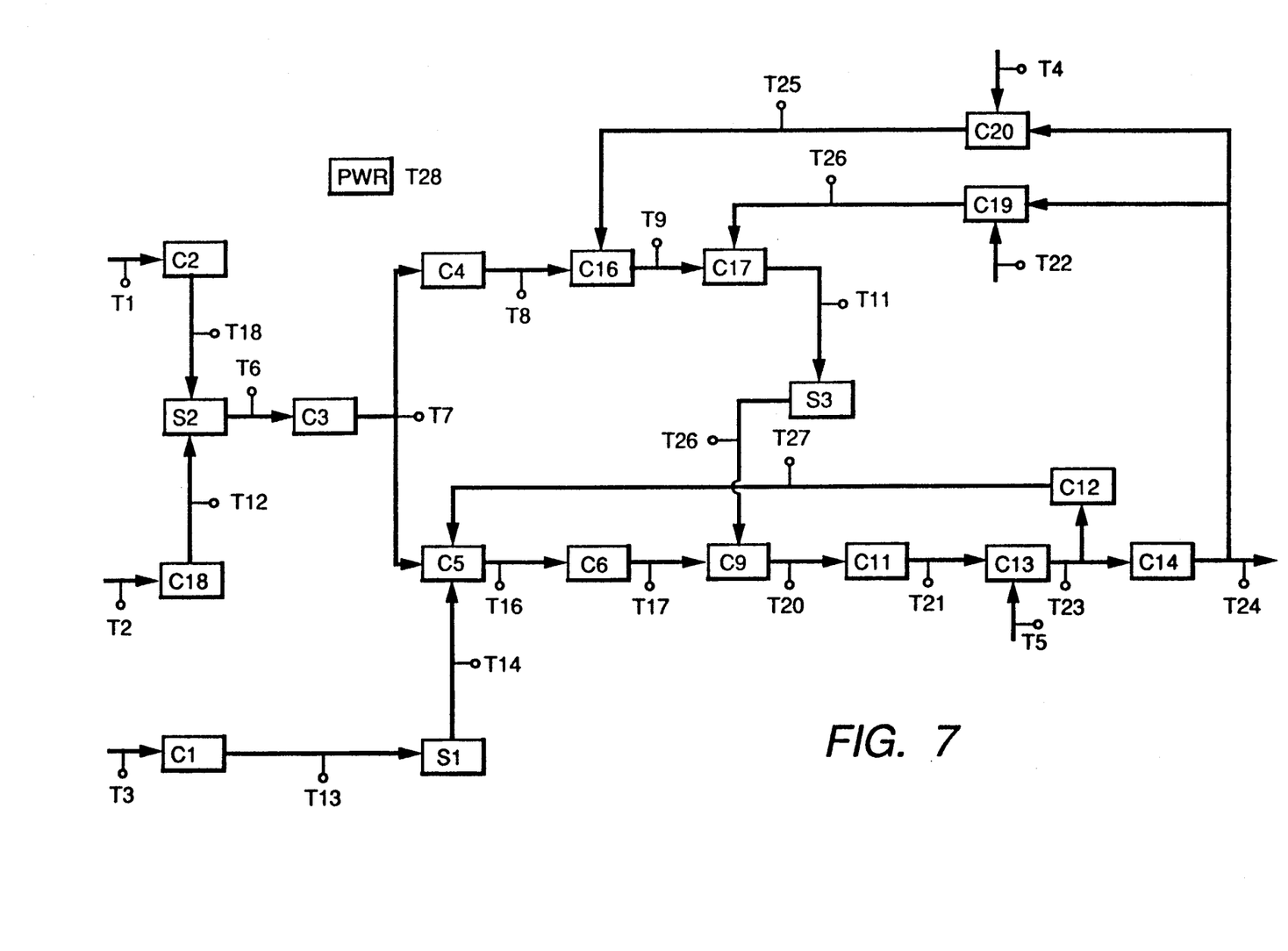
FIG. 7 is another block diagram of the feedback control system shown in block diagram in FIG. 2.

FIG. 7 illustrates another block diagram of the feedback control system shown in the block diagram in FIG. 2. This model was utilized to automatically generate the multi-branched diagnostic tree partially shown in FIG. 8. A granularity of three was selected for automatic generation of the tree shown in FIG. 8, and the root node corresponds to output terminal T24. Each of the nodes in the tree represents a specific test measurement except for the "leaf" nodes, i.e. the nodes not having branches extending therefrom. The leaf nodes identify the faulty component, or the leaf node is empty. It is to be understood that the empty leaf nodes actually identify multiple faults indicating that multiple components are not operating properly. These nodes were left empty to provide more clarity in FIG. 8. As discussed above, diagnosis can be continued at the multiple fault nodes at the expense of creating a larger tree. The nodes which are shaded denote nodes for which a fault was not detected or the fault was not isolatable. These result from translating quantitative measurement results into qualitative intervals, even though there may be many intervals. The higher branching-factor used, the fewer shaded nodes result.

Figure 8:
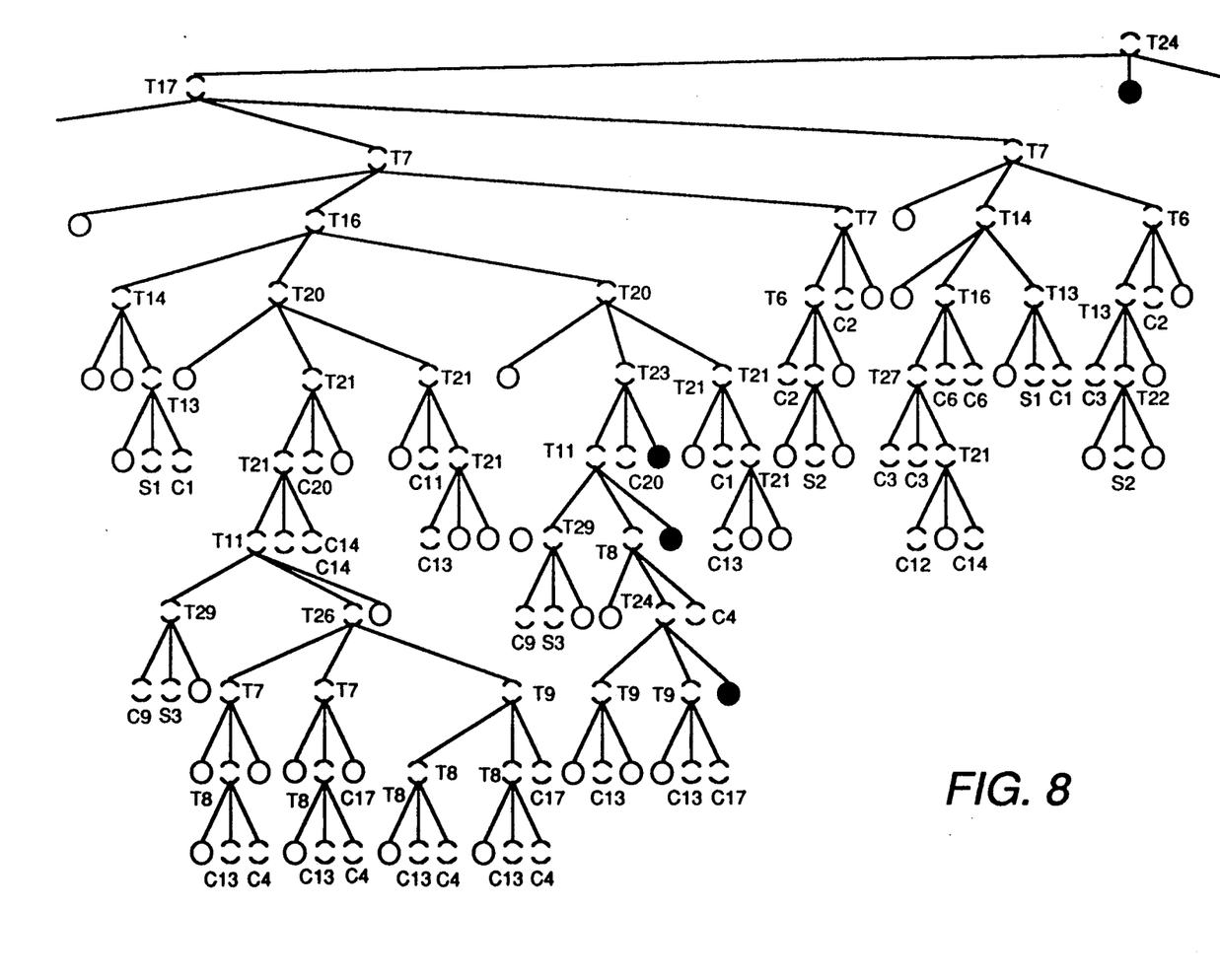
FIG. 8 illustrates a portion of a ternary diagnostic tree automatically generated by the present invention for the block diagram of the feedback control system illustrated in FIG. 7.

From the tree illustrated in FIG. 8, is should be apparent that the multi-branched tree provides quick identification of a measurement to be made. Specifically, the system user simply measures the output terminal, and depending upon the value of the measurement, the user follows the corresponding branch, e.g. HIGH, OK or LOW, to the next measurement node. When the branch terminates at a leaf node, then the faulty component has been isolated and can be repaired or replaced.

Another feature of the present apparatus and method is that the system can be utilized to automatically choose the granularity, locally within the diagnostic tree, during generation of the tree. That is, in this alternative embodiment, the system user does not select a fixed branching factor except for the root node. Rather, the number of branches from a given node is dynamically determined by the system itself during the tree generation process. Specifically, the propagation mechanism of the model-based system is utilized to propagate a range of values. After the first application of the range propagation mechanism following the entry of measurement results, each measurement node will have one or more interval values assigned to it. These interval values can be used to designate the selected intervals for that measurement. For example, if two ranges overlap, then the ranges defined by the intersected and non-intersected portions of each range will be identified by the system as the ranges of interest. For illustrative purposes only, assume a node has a LOW range 1-7 and a HIGH range 5-10. The following interval ranges for that particular node will then be assigned to respective branches from that node as follows:
INTERVAL-1: 1-5,
INTERVAL-2: 5-7, and
INTERVAL-3: 7-10.

Note that these intervals may or may not bear resemblance to the "OK" intervals determined by model simulation. In a similar manner, a range may be determined for each measurement node and the number of branches extending from each node corresponds to the number of determined ranges of interest. The diagnostic tree generated utilizing the range propagation mechanism is referred to as an "n-ary" tree to indicate that the number of branches extending from each measurement node may be any integer greater than one and typically greater than two.

Even more specifically, the method for automatically assigning a granularity to each node begins with establishing at least one terminal as a root node and establishing the root node as a selected node. Then a value for the terminal is determined, for example by simulation with the model, and a granularity for the root node is selected. The granularity of the root node may be selected by a system user or automatically. For example, one method for automatically determining the root node granularity is as follows. Initially, a granularity of three is selected, such as by prior programming, for the root node with the expected interval (OK) being determined by simulation, and intervals are defined above (HIGH) and below (LOW) the expected interval. Then propagation is performed utilizing the LOW interval. If no conflict is detected, then new intervals are inserted adjacent to the HIGH and LOW intervals, the new intervals being of the same width as the OK interval. The granularity of the root node is thus increased to five and the HIGH and LOW intervals have been reduced. Then, the prior propagation results are removed and propagation is again performed with the newly-defined LOW interval. If no conflict is detected, the steps of inserting new intervals adjacent to the HIGH and LOW intervals, removing prior propagation results, and propagating the LOW interval are repeated. When a conflict is finally detected during propagation with a LOW interval, the procedure concludes and the root node granularity will equal the total number of established intervals.

Then, a plurality of branches are generated to extend from the root node, the number of branches extending from the root node corresponding to the granularity as determined above. A branch value then is selected to correspond to each generated branch. For example, if the simulated value for the terminal represented as the root node is 5-6 V, and if a granularity of three is assigned to the root node, then the following values may be assigned to each branch:
Branch 1: 1-5 V,
Branch 2: 5-6 V, and
Branch 3: 6-15 V.

One of the branches of the root node is then selected for analysis. The branch value of the selected branch is propagated through the model, conflict sets are found, and the system then attempts to identify a next measurement to be made at a terminal. If no next measurement can be found, then the selected branch is terminated in a leaf node. If a next measurement is found, then the selected branch is terminated with a node identifying the next terminal to be measured. For example, if Branch 1 of the above example is selected, then a range of 1-5 V is entered as the value of the terminal corresponding to the root node, and propagation is performed by the propagation mechanism. If one or more conflicts are found, then the best measurement identify a next terminal to be measured. If no terminal is identified, then a leaf node will be established at the end of the selected branch. If a terminal is identified, then a measurement node identifying this terminal is established at the end of the selected branch.

If a measurement node is identified, then a number (N) of numeric ranges are determined by using the intervals propagated to the terminal to be measured as explained above. For example, if a terminal T1 in the above example is identified as a next measurement for Branch 1, the following operations will occur. Since the system at this time has had at least two ranges propagated therethrough, i.e. the first simulation value and then the value corresponding to Branch 1, terminal T1 may have two different ranges, Range 1 and Range 2, assigned thereto. For example, Range 1 may equal 20-28 V and Range 2 may equal 25-32 V. Since Range 1 and Range 2 overlap, the system will establish branches and assign the following values to each branch:

Branch$_{T1}$ 1: <20 V,
Branch$_{T1}$ 2: 20-25 V,
Branch$_{T1}$ 3: 25-28 V,
Branch$_{T1}$ 4: 28-32 V and
Branch$_{T1}$ 5: >32 V.

In this manner, branches are automatically generated and values are assigned thereto.

Importantly, the manner of determining the number of branches and assigning ranges to each branch is not limited to particular ranges or a specific method. For example, the overlapping portions of each range could form more than one branch and the non-overlapping ranges could form more than one branch. One method for increasing the granularity at a specific node, for example, after generation of initial branches and initial branch intervals, is to determine, where possible, a midpoint for each initial branch interval. Then new branches are generated and ranges are assigned to each new branch in accordance with ranges established by the initial intervals and their midpoints. For example, the following ranges could be assigned to branches for the measurement node for terminal T1:

Branch$_{T1}$ 1: <20 V,
Branch$_{T1}$ 2: 20-22.5 V,
Branch$_{T1}$ 3: 22.5-25 V,
Branch$_{T1}$ 4: 25-26.5 V.
Branch$_{T1}$ 5: 26.5-28 V,
Branch$_{T1}$ 6: 28-30 V,
Branch$_{T1}$ 7: 30-32 V, and
Branch$_{T1}$ 8: >32 V.

As granularity is increased, however, the size of the tree also increases. Therefore, it may be desirable to place an upper limit, i.e. a maximum, on the number of branches from each node. Many other methods for increasing granularity are possible and contemplated.

Likewise, just as granularity can be increased, granularity can be decreased. One method for decreasing the granularity at a specific node, for example, after generation of initial branches and initial branch intervals, is to combine initial intervals such as in a consecutive pairwise manner. For example, the following ranges could be assigned to branches for the measurement node for terminal T1:

Branch$_{T1}$ 1: <25 V,
Branch$_{T1}$ 2: 25-32 V, and
Branch$_{T1}$ 3: >32 V.

As granularity is decreased, however, the diagnostic accuracy of the tree may be reduced. Many other methods for decreasing granularity are possible and contemplated.

Also, it is possible that ranges at a terminal may not overlap or may entirely overlap. If those circumstances occur, the system will automatically generate branches, for example, by identifying each non-overlapping portion of each range as a branch, and then establish other ranges for other branches. For example, if for terminal T1, Range 1 equals 1-5 V and Range 2 equals 8-12 V, then the system will establish branches and assign the following values:

Branch$_{T1}$ 1: <1 V,
Branch$_{T1}$ 2: 1-5 V,
Branch$_{T1}$ 3: 5-8 V,
Branch$_{T1}$ 4: 8-12 V and
Branch$_{T1}$ 5: >12 V.

On the other hand, if Range 1=Range 2=6-9 V, then the system will establish branches and assign the following values:

Branch$_{T1}$ 1: <6 V,
Branch$_{T1}$ 2: 6-9 V, and
Branch$_{T1}$ 3: >9 V.

Again, the above ranges are for illustrative purposes and many different range sets could be generated.

The above-explained process is repeated for each branch and until all paths of the tree terminate in leaf nodes. In this manner, an n-ary tree is generated. Importantly, the number of branches from each node in the n-ary tree may vary and the number of branches and corresponding values are automatically selected. The n-ary tree generation process therefore even further automates diagnostic tree generation.

Figure 9:
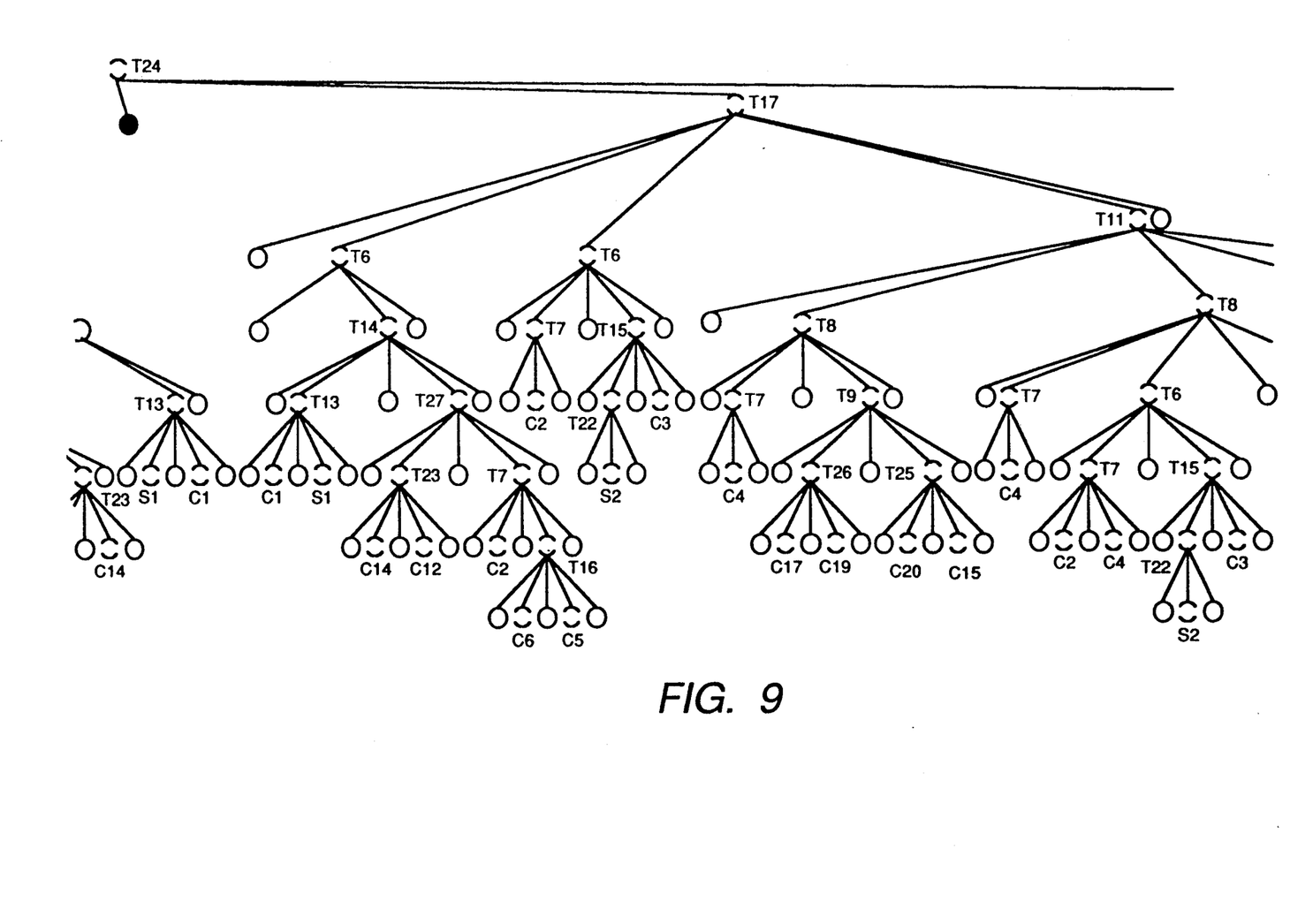
FIG. 9 illustrates a portion of an n-ary diagnostic tree automatically generated by the present invention for the block diagram of the feedback control system illustrated in FIG. 7.

An example of an n-ary tree is shown in FIG. 9. This tree was automatically generated utilizing the model illustrated in FIG. 7. Note that the number of branches extending downward from each measurement node may vary.

A diagnostic tree may, for example, be printed-out in hardcopy or may be stored on a floppy disk for use in a portable computer in actual operating environment.

While embodiments of the present invention have been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for automated generation of a multi-branched diagnostic tree for isolation of faults in a system comprising the steps of storing a model of the system to be diagnosed in a memory, said model including terminals indicating measurement points in the system to be diagnosed, inputting into the system measurements of taken at the measurement points in the system,
propagating the variables through the model for automated generation of a diagnostic tree;

determining an operating value for each of said terminals;

selecting a granularity for each node of said diagnostic tree;

establishing at least one terminal as a root node and establishing the root node as a selected node;

generating a plurality of branches extending from said selected node, the number of branches extending from said selected node corresponding to each selected granularity, and selecting a branch value to correspond to each of said generated branches;

selecting one of said branches of said selected node not terminating in a leaf node for analysis;

propagating the branch value of said selected branch through said model thereby generating a propagated value for said terminals;

identifying conflicts between propagated values at each terminal and generating conflict candidate sets;

terminating the selected branch with a leaf node denoting no further fault isolation is possible if no conflict set exists;

terminating the selected branch with a node denoting multiple faults if multiple, nonintersecting conflict sets exits;

terminating the selected branch with a leaf node denoting a single fault if one conflict set having a single component exists;

attempting to identify a next measurement to be made if at least one conflict set exists, terminating the selected branch with a leaf node denoting no further fault isolation is possible if no next measurement can be identified, terminating the selected branch with a measurement node corresponding to an identified next measurement and establishing said measurement node as the selected node and returning to the step of generating a plurality of branches if a next measurement can be identified;

finding a branch not terminated with a node and establishing the found branch as the selected branch and returning to the step of propagating the branch value of said selected branch;

finding a measurement node without established branches, establishing said measurement node as the selected node, and returning to the step of generating a plurality of branches if a measurement node is established; and stopping tree generation if all branches are terminated with leaf nodes.

2. A method for automated generation of a diagnostic tree in accordance with claim 1 wherein selecting the granularity of each node of said tree comprises the step of:

setting the granularity of each node to equal at least two if at least one component of said system to be diagnosed has an analog input or output.

3. A method for automated generation of a diagnostic tree in accordance with claim 1 wherein the granularity of each node is equal to the granularity of the root node.

4. A method for automated generation of a diagnostic tree in accordance with claim 1 wherein the granularity of each node may vary.

5. A method for automated generation of a diagnostic tree in accordance with claim 1 wherein the granularity of each node is selected by a system user.

6. A method for automated generation of a diagnostic tree in accordance with claim 1 wherein the granularity of each node is selected automatically.

7. A method for automated generation of a diagnostic tree in accordance with claim 1 wherein establishing a terminal of said model as a root node comprises the steps of:

identifying an outout terminal of said model; and
establishing said identified output terminal as said root node.

8. A method for automated generation of a diagnostic tree in accordance with claim 1 wherein establishing a terminal of said circuit model as a root node comprises the steps of:

identifying a component most likely to be faulty based on prior experience;

identifying an output terminal of said identified component; and establishing said identified output terminal as said root node.

9. A method for automated generation of a diagnostic tree in accordance with claim 1 wherein measurement at a plurality of terminals is established as a root node.

10. A method for automated generation of a diagnostic tree in accordance with claim 1 wherein said selected value is a single numerical value.

11. A method for automated generation of a diagnostic tree in accordance with claim 1 wherein said selected value is a range of numerical values.

12. A method for automated generation of a diagnostic tree in accordance with claim 1 further comprising the step of:

finding a node denoting multiple faults, establishing said multiple fault node as a selected node and returning to step (d) before stopping tree generation.

13. A method for automated generation of a diagnostic tree in accordance with claim 1 wherein a node denoting multiple faults is established as a leaf node.

14. An automated diagnostic computer system, comprising:

input means for entering and editing information in the system and generating a model of a system to be diagnosed, said model including terminals indicating measuring points in the system to be diagnosed, a memory in the system for storing said model;

means for making predictions about terminal values using said model and assigning predicted values to terminals of said model;

means for generating conflicts between said assigned values and actual measured values and between different sets of assigned values;

means for identifying a next measurement to be made for isolating a fault;

means for determining an operating value for each of said terminals;

means for selecting a granularity for each node of said diagnostic tree;

means for establishing a first terminal as a root node and establishing the root node as a selected node;

means for generating a plurality of branches extending from said selected node, the number of branches extending from said selected node corresponding to said selected granularity, and selecting a branch value to correspond to each of said generated branches;

means for selecting one of said branches of said selected node not terminating in a leaf node for analysis;

means for propagating the branch value of said selected branch through said model thereby generating a propagated value for said terminals;

means for identifying conflicts between propagated values at each terminal and generating conflict candidate sets;

means for terminating the selected branch with a leaf node denoting no further fault isolation is possible if no conflict set exists;

means for terminating the selected branch with a node denoting multiple faults if multiple, nonintersecting conflict sets exists;

means for terminating the selected branch with a leaf node denoting a single fault if one conflict set having a single component exists;

means for attempting to identify a next measurement to be made if at least one intersecting conflict set exists, terminating the selected branch with a leaf node denoting no further fault isolation is possible if no next measurement can be identified, terminating the selected branch with a measurement node corresponding to an identified next measurement and establishing said measurement node as the selected node and if a next measurement can be identified generating a plurality of branches extending from said selected node, the number of branches extending from said selected node corresponding to said selected granularity, and selecting a branch value to correspond to each of said generated branches;

means for finding a branch not terminated with a node and establishing the found branch as the selected branch and propagating the branch value of said selected branch through said model thereby generating a propagated value for said terminals; and means for finding a measurement node without established branches, establishing said measurement node as the selected node, and if a measurement node is established generating a plurality of branches extending from said selected node, the number of branches extending from said selected node corresponding to said selected granularity, and selecting a branch value to correspond to each of said generated branches; and means for stopping tree generation if all branches are terminated with leaf nodes.

15. An apparatus for automated generation of a diagnostic tree in accordance with claim 14 wherein said means for selecting the granularity of each node of said tree comprises:

means for setting the granularity of each node to equal at least two if at least one component of said system to be diagnosed has an analog input or output.

16. An apparatus for automated generation of a diagnostic tree in accordance with claim 14 wherein said means for identifying a next measurement identify a measurement which results in a minimum number of measurements required to isolate a fault.

17. An apparatus for automated generation of a diagnostic tree in accordance with claim 14 wherein said means for identifying a next measurement identify a measurement which results in a minimum cost to isolate a fault.

18. An apparatus for automated generation of a diagnostic tree in accordance with claim 14 wherein the granularity of each node is equal to the granularity of the root node.

19. An apparatus for automated generation of a diagnostic tree in accordance with claim 14 wherein the granularity of each node may vary.

20. An apparatus for automated generation of a diagnostic tree in accordance with claim 14 wherein said means for selecting a granularity for each node of said diagnostic tree comprises means for providing that the granularity of each node is selected by a system user.

21. An apparatus for automated generation of a diagnostic tree in accordance with claim 14 wherein said means for selecting a granularity for each node of said diagnostic tree comprises means for providing that the granularity of each node is selected automatically.

22. An apparatus for automated generation of a diagnostic tree in accordance with claim 14 wherein said means for establishing a terminal of said model as a root node comprises:

means for identifying an output terminal of said model; and means for establishing said identified output terminal as said root node.

23. An apparatus for automated generation of a diagnostic tree in accordance with claim 14 wherein said means for establishing a terminal of said model as a root node comprises:

means for identifying a component most likely to be faulty based on prior experience;

means for identifying an output terminal of said identified component; and means for establishing said identified output terminal as said root node.

24. An apparatus for automated generation of a diagnostic tree in accordance with claim 14 further comprising means for establishing measurement at a plurality of terminals as a root node.

25. An apparatus for automated generation of a diagnostic tree in accordance with claim 14 wherein said selected value is a single numerical value.

26. An apparatus for automated generation of a diagnostic tree in accordance with claim 14 wherein said selected value is a range of numerical values.

27. An apparatus for automated generation of a diagnostic tree in accordance with claim 14 further comprising:

means for finding a node denoting multiple faults, establishing said multiple fault node as a selected node and returning to step (d) before stopping tree generation.

28. An apparatus for automated generation of a diagnostic tree in accordance with claim 14 mean for establishing a node denoting multiple faults is as a leaf node.

29. An apparatus in accordance with claim 14 wherein said means for terminating the selected branch with a leaf node comprises means for terminating the selected branch with a leaf node which identifies multiple faulty components.

30. A method for automatically assigning a granularity to an internal node of a diagnostic tree of a model-based diagnostic reasoning system, said diagnostic tree including root nodes, integral nodes and branches, said method comprising the steps of:

a) establishing at least one terminal of the model as a root node and establishing the root node as a selected node;

b) determining a value for said one terminal;
c) selecting a granularity for said root node;
d) generating a plurality of branches extending from said root node, the number of branches extending from said root node corresponding to the selected granularity and selecting a branch value to correspond to each said generated branches;
e) selecting one of said branches of said selected node not terminating in a node for analysis;
f) propagating the branch value of said selected branch;
g) attempting to identify a next measurement to be made at a terminal and if no next measurement can be identified then terminating said selected branch in a leaf node;
h) terminating the selected branch with a node identifying the terminal to be measured if a next measurement is identified;
i) determining a number (N) of numeric ranges using the intervals propagated to the terminal to be measured;
j) generating N branches from said node identifying the terminal to be measured;
k) assigning each said branch one of said interval ranges;
l) establishing a node having at least one branch not terminating in a node as the selected node and returning to step (e); and
m) stopping tree generation when all paths of the tree terminate in leaf nodes.

31. A method for automatically assigning a granularity to each internal node in accordance with claim 30 wherein determining a number (N) of interval ranges resulting from propagating the range of values comprises the steps of:
determining if any ranges intersect; and
assigning each non-intersected portion of each said range to a respective branch and assigning each intersected portion to a respective branch.

32. A method for automatically assigning a granularity to each internal node in accordance with claim 31 further comprising the steps of:
determining a mid-point for each of said non-intersected and intersected portions where possible;
defining ranges in accordance with each of said non-intersected portions and their respective midpoints and each of said intersected portions and their respective midpoints; and
generating branches and assigning each branch one of said defined ranges.

33. A method for automatically assigning a granularity to each internal node in accordance with claim 31 further comprising the steps of:
combining intervals in a consecutive pair-wise manner;
defining ranges in accordance with said combined intervals; and
generating branches and assigning each branch one of said defined ranges.

34. A method for automatically assigning a granularity to each internal node in accordance with claim 30 wherein the granularity of said root node is user selected.

35. A method for automatically assigning a granularity to each internal node in accordance with claim 30 wherein the granularity of said root node is automatically selected.

36. A method for automatically assigning a granularity to each internal node in accordance with claim 30 wherein a maximum limit as to the number (N) of branches generated from a node is predetermined.

* * * * *